(12) United States Patent
Hsieh (10) Patent No.: US 10,248,455 B2
(45) Date of Patent: Apr. 2, 2019

(54) STORAGE DEVICE AND TASK EXECUTION METHOD THEREOF, AND HOST CORRESPONDING TO THE STORAGE DEVICE AND TASK EXECUTION METHOD THEREOF

(71) Applicant: Silicon Motion, Inc., Jhubei, Hsinchu (TW)

(72) Inventor: Chao-Kuei Hsieh, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 244 days.

(21) Appl. No.: 15/227,934

(22) Filed: Aug. 3, 2016

(65) Prior Publication Data

US 2017/0132035 A1 May 11, 2017

Related U.S. Application Data

(60) Provisional application No. 62/253,611, filed on Nov. 10, 2015.

(51) Int. Cl.
*G06F 9/46* (2006.01)
*G06F 9/48* (2006.01)
*G06F 3/06* (2006.01)

(52) U.S. Cl.
CPC .......... *G06F 9/4881* (2013.01); *G06F 3/0611* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2010/0262979 A1* | 10/2010 | Borchers | ................. | G06F 9/544 719/321 |
| 2012/0311197 A1* | 12/2012 | Larson | .................... | G11C 7/10 710/22 |
| 2014/0137128 A1* | 5/2014 | Chang | ................... | G06F 9/4881 718/103 |
| 2014/0297776 A1* | 10/2014 | Volvovski | ......... | G06F 17/30194 709/212 |

FOREIGN PATENT DOCUMENTS

| | | |
|---|---|---|
| CN | 102855218 | 1/2013 |
| TW | 201516857 | 5/2015 |

\* cited by examiner

*Primary Examiner* — Diem K Cao (57) ABSTRACT

A storage device includes a data storage media and a control unit. The control unit is electrically coupled to the data storage media and configured for controlling the data storage media. The control unit is configured to receive a task assignment packet from a host. The task assignment packet includes a plurality of tasks and each of the tasks has a task ID. The control unit is configured to sort the tasks and generate an execution order for the tasks and reply the host with a task arrangement packet according to the execution order. A task execution method of the storage device and the host and a task execution method thereof are also provided.

17 Claims, 6 Drawing Sheets

FIG. 1

| command index | command parameter | function description |
|---|---|---|
| CMD46 | [31]obtain task packet<br>[30:21]reserved<br>[20:16]task ID<br>[15:0]reserved | execute read task<br>[31]<br>1:obtain task arrangement packet from storage device<br>0:execute read task corresponding to task ID specified by bits [20:16] in task arrangement packet<br>[20:16]<br>effective only bit [31] is 0 |
| CMD47 | [31]transmit task packet<br>[30:21]reserved<br>[20:16]task ID<br>[15:0]reserved | execute write task<br>[31]<br>1:transmit task assignment packet to storage device<br>0:execute write task corresponding to task ID specified by bits [20:16] in task arrangement packet<br>[20:16]<br>effective only bit [31] is 0 |

FIG. 2

| offset (byte) | | name | length (byte) |
|---|---|---|---|
| 0 | +0 | version | 1 |
| | +1 | number of entries = N | 1 |
| | +2 | reserved | 6 |
| 8 | +0 | [7]set/abort<br>[6]read/write<br>[5]priority<br>[4:0]task ID | 1 |
| | +1 | reserved | 1 |
| | +2 | block length | 2 |
| | +4 | address | 4 |
| ⋮ | ⋮ | ⋮ | |
| 8×N | +0 | [7]set/abort<br>[6]read/write<br>[5]priority<br>[4:0]task ID | 1 |
| | +1 | reserved | 1 |
| | +2 | block length | 2 |
| | +4 | address | 4 |
| 8×(N+1) | +0 | reserved | 504−8N |

FIG. 3

| offset (byte) | | name | length (byte) |
|---|---|---|---|
| 0 | +0 | version | 1 |
| | +1 | number of entries = N | 1 |
| 2 | +0 | [7]set/abort<br>[6]read/write<br>[5]priority<br>[4:0]task ID | 1 |
| | +1 | status | 1 |
| ⋮ | | ⋮ | |
| 2×N | +0 | [7]set/abort<br>[6]read/write<br>[5]priority<br>[4:0]task ID | 1 |
| | +1 | status | 1 |
| 2×(N+1) | +0 | reserved | 510−2N | execution order ↓

STORAGE DEVICE AND TASK EXECUTION METHOD THEREOF, AND HOST CORRESPONDING TO THE STORAGE DEVICE AND TASK EXECUTION METHOD THEREOF

FIELD OF THE INVENTION

The present invention relates to a data storage-related technology, and more particularly to storage device and task execution method thereof, corresponding host and task execution method thereof.

BACKGROUND OF THE INVENTION

In the conventional technique, host (such as computers, mobile phones, etc.) sequentially issues commands one by one to electrically-coupled storage device (such as flash memory, etc.); and correspondingly, the storage device executes corresponding tasks (such as write, read, etc.) according to the sequence of the commands transmitted from the host. However, in this conventional operation manner, the storage device must execute tasks according to the sequence arranged by the host. Thus, once a task has a relatively-long execution time, the following other tasks have to wait; and consequentially the task execution efficiency may be relatively low.

SUMMARY OF THE INVENTION

One object of the present invention is to provide a storage device having optimistic task execution efficiency.

Another object of the present invention is to provide a task execution method of the aforementioned storage device.

Still another object of the present invention is to provide a host corresponding to the aforementioned storage device.

Still yet another object of the present invention is to provide a task execution method of the aforementioned host.

Still yet another object of the present invention is to provide a control unit of the aforementioned storage device.

The present invention provides a storage device, which includes a data storage media and a control unit. The control unit is electrically coupled to and configured for controlling an operation of the data storage media. The control unit is further configured for receiving a task assignment packet from a host. The task assignment packet includes a plurality of tasks and each one of the tasks has a task identification (ID). The control unit is further configured for sorting the tasks of the task assignment packet to generate an execution order for the tasks r and reply the host with a task arrangement packet according to the execution order.

The present invention further provides a host, which includes a connection interface and a central processing unit. The connection interface is electrically coupled to a storage device. The central processing unit is configured for transmitting a task assignment packet to the storage device via the connection interface. The task assignment packet includes a plurality of tasks, each of the tasks has a task ID. The central processing unit is further configured for receiving a task arrangement packet replied from the storage device via the connection interface and sequentially issuing execution commands for the tasks according to the task arrangement packet to the storage device via the connection interface.

The present invention further provides a task execution method of a storage device. The task execution method includes: receiving a task assignment packet from a host, wherein the task assignment packet comprises a plurality of tasks and each one of the tasks has a task ID; and sorting the tasks in the task assignment packet to generate an execution order for the tasks and replying the host with a task arrangement packet according to the execution order.

The present invention further provides a task execution method of a host. The task execution method includes: transmitting a task assignment packet to a storage device, wherein the task assignment packet comprises a plurality of tasks and each one of the tasks has a task ID; and receiving a task arrangement packet replied from the storage device and sequentially issuing execution commands for the tasks according to the task arrangement packet to the storage device.

In summary, a host first of the present invention transmits a task assignment packet containing a plurality of tasks to a storage device of the present invention; the storage device then sorts an execution sequence of the tasks in the task assignment packet and accordingly replies a task arrangement packet to the host; and accordingly the host then sequentially issues execution commands of the aforementioned tasks to the storage device. Therefore, the storage device of the present invention has optimistic task execution efficiency.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
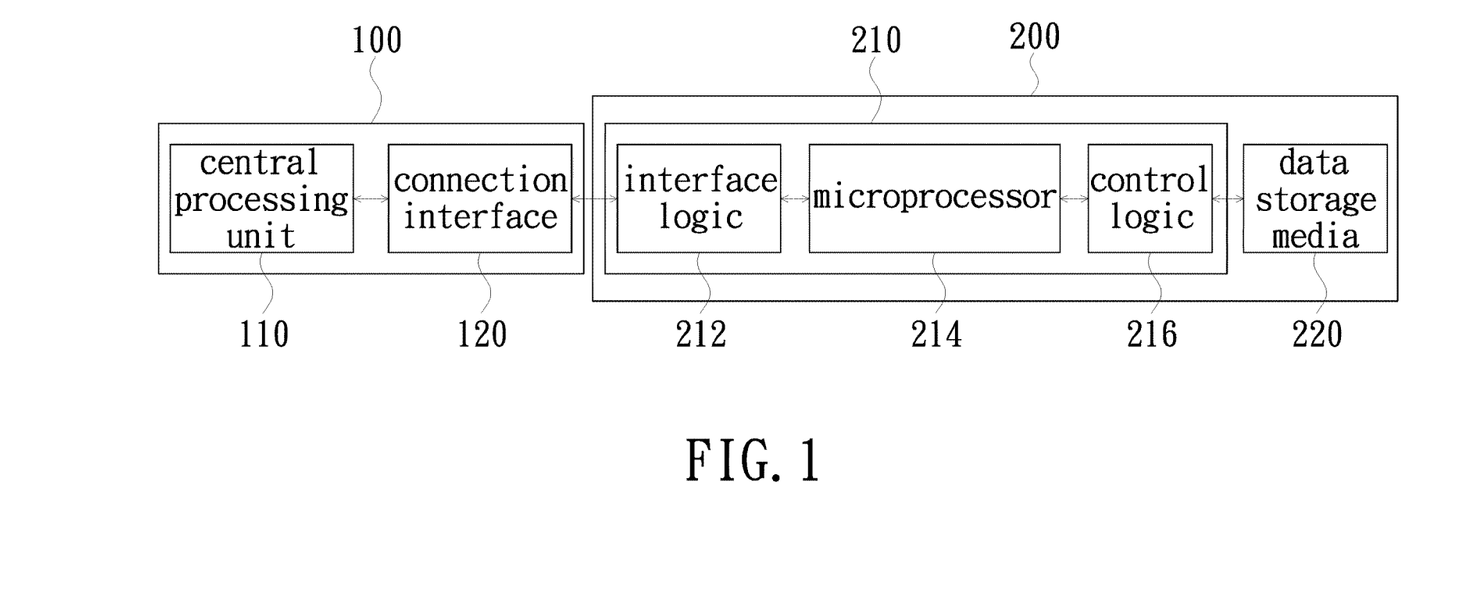
FIG. 1 is a schematic block view of a host, a corresponding storage device and an electrical connection relationship between the two in accordance with an embodiment of the present invention.

FIG. 1 is a schematic block view of a host, a corresponding storage device and an electrical connection relationship between the two in accordance with an embodiment of the present invention. As shown in FIG. 1, the host 100 of the present embodiment includes a central processing unit 110 and a connection interface 120. The connection interface 120 is electrically coupled to a storage device 200. The central processing unit 110 is capable of transmitting a task assignment packet to the storage device 200 through the connection interface 120. The task assignment packet contains a plurality of tasks, each of which has a task identification (ID) (will be described in detail later). At least one of the aforementioned tasks is a read task or a write task. In the present embodiment, the host 100 is exemplarily implemented by computer, mobile phone, tablet PC, camera or any handheld electronic device having arithmetic function.

As shown in FIG. 1, the storage device 200 of the present embodiment includes a control unit 210 and a data storage media 220. The control unit 210 is electrically coupled to the data storage media 220 and capable of controlling an operation of the data storage media 220 (for example, data access and data erase). In the present embodiment, the data storage media 220 is exemplarily implemented by a non-volatile memory, such as flash memory, Magnetoresistive RAM (Magnetoresistive Random Access Memory), Ferroelectric RAM (Ferroelectric Random Access M), PCM (Phase Change Memory), STTRAM (Spin-Transfer Torque RAM), ReRAM (Resistive RAM) and Memristor capable of storing data for a long time. The control unit 210 includes an interface logic 212, a microprocessor 214 and a control logic 216. The microprocessor 214 is electrically coupled to the interface logic 212 and the control logic 216. The microprocessor 214 is capable of accessing the data stored in the data storage media 220 through the control logic 216 and receive commands or data (such as write command, read command, erase command or task assignment packet) from the host 100 through the interface logic 212. After receiving the task assignment packet from the host 100, the microprocessor 214 is capable of sorting the tasks in the task assignment packet and generate an execution order accordingly. Then, the microprocessor 214 replies a task arrangement packet in response to a demand of the host 100, or, initiatively transmits the task arrangement packet to the host 100 after the completion of the sorting. In the present embodiment, the task arrangement packet contains the execution order of the aforementioned tasks and the respective task IDs. After receiving the task arrangement packet replied from the storage device 200 through the connection interface 120, accordingly the central processing unit 110 sequentially issues commands to execute the aforementioned tasks to the storage device 200 through the connection interface 120.

Accordingly, the microprocessor 214 receives at least one task ID (for example, 32 task IDs) from the host 100 and then executes the tasks corresponding to the received task IDs. In one embodiment, at least one task ID corresponds to the task in the task arrangement packet having the highest priority in the execution order. Namely, in the present invention, the microprocessor 214 can generate the execution order according to the resource allocation itself and the actual processing requirement of the tasks and then reply the generated execution order of the tasks via the task arrangement package to the host 100, so that the host 100 can sequentially issues commands to execute the aforementioned tasks according to the execution order generated by the microprocessor 214. Through the aforementioned operation, the storage device 200 provides optimistic task execution efficiency. Further, because the subsequent communication between the microprocessor 214 and the central processing unit 110 is based on the task IDs, the amount of data transmission between the two can be effectively reduced.

Additionally, in another embodiment, each one of the aforementioned tasks may be set a priority, so that the microprocessor 214 can sort the execution order of these tasks based on the priorities of these tasks and then accordingly reply the task arrangement packet to the host 10. In one embodiment, it is understood that the task set a priority is treated as the highest or a higher priority task during task execution. In another embodiment, the content of the task arrangement packet may further contain a status of each task, such as good, write protection violation or out of range, so that the host 100 can know the process conditions of these tasks. To have a proper operation, the central processing unit 110 in one embodiment may transmit a write command to the microprocessor 214 before the transmission of a task assignment packet so as to inform the microprocessor 214 to get ready to receive the task assignment packet. Based on the same manner, the central processing unit 110 in one embodiment may transmit a read command to the microprocessor 214 before the transmission of a task arrangement packet so as to inform the microprocessor 214 to start to transmit the task arrangement packet.

In order to illustrate the present invention clearly, hereunder a flash memory is taken as an example for illustrating an operation of the data storage media 220. In the example of operation, the definitions of read command, write command and task assignment packet transmitted from the central processing unit 110 to the microprocessor 214 and task arrangement packet replied from the microprocessor 214 to the central processing unit 110 will be introduced first as follow.

Figure 2:
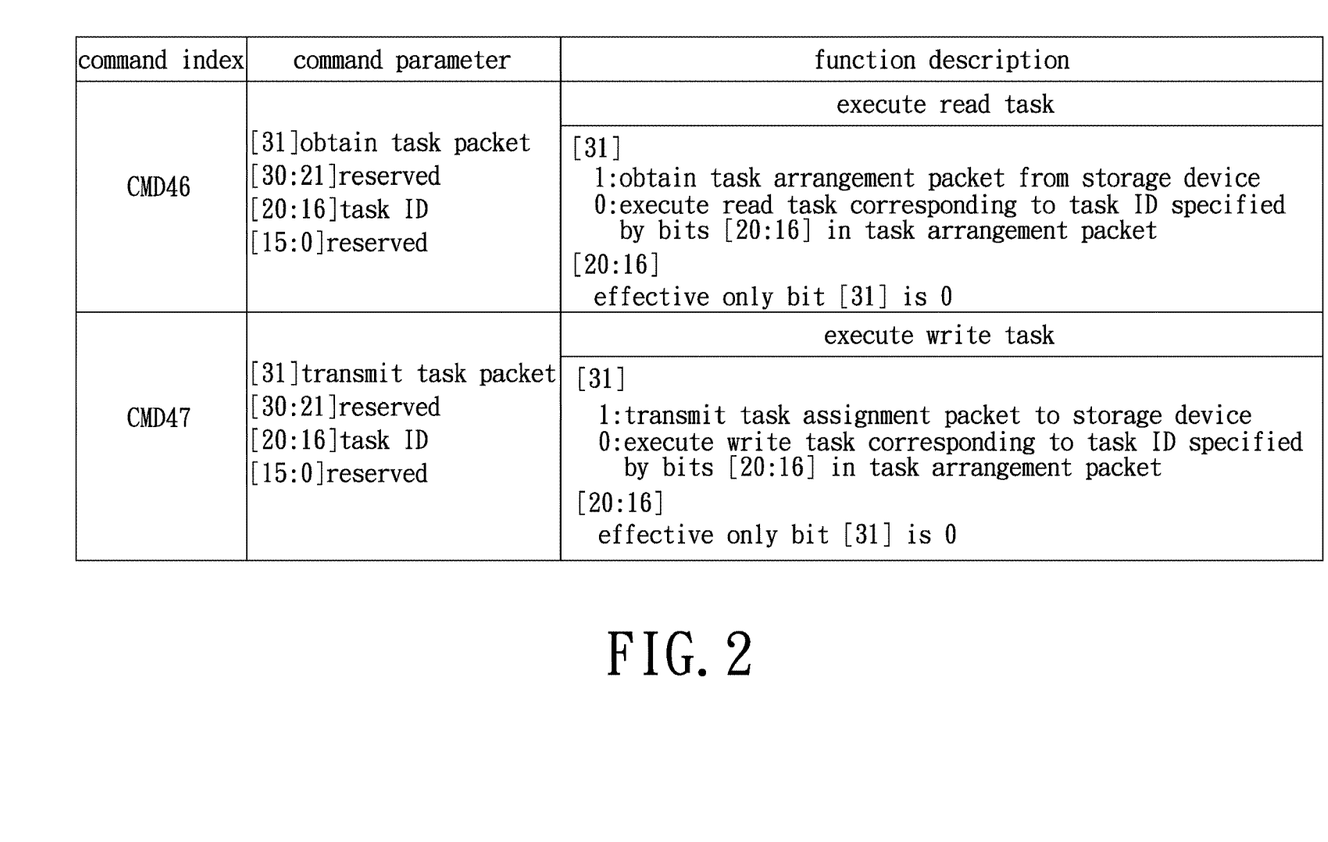
FIG. 2 is an exemplary definition of a read command and a write command in accordance with an embodiment of the present invention.

Referring to FIG. 2, which is an exemplary definition of a read command and a write command in accordance with an embodiment of the present invention. As shown in FIG. 2, the read command CMD46 has 32 bits for storing information about the execution of a read task. When the bit [31] in the read command CMD46 is set to 1, the microprocessor 214 is informed that the central processing unit 110 is about to obtain a task arrangement packet from the storage device 200. When the bit [31] in the read command CMD46 is set to 0, the microprocessor 214 executes the read task corresponding to the task ID specified by the bits [20:16] in the task arrangement packet. Further, it is to be noted that the microprocessor 214 needs to execute the read task corresponding to the task ID specified by the bits [20:16] only when the bit [31] is set to 0.

As shown in FIG. 2, the write command CMD47 also has 32 bits for storing information about the execution of a write task. When the bit [31] in the write command CMD47 is set to 1, the microprocessor 214 is informed that the central processing unit 110 is about to transmit a task assignment packet. When the bit [31] in the write command CMD47 is set to 0, the microprocessor 214 executes the write task corresponding to the task ID specified by the bits [20:16] in the task assignment packet. Further, it is to be noted that the microprocessor 214 needs to execute the write task corresponding to the task ID specified by the bits [20:16] only when the bit [31] is set to 0.

Figure 3:
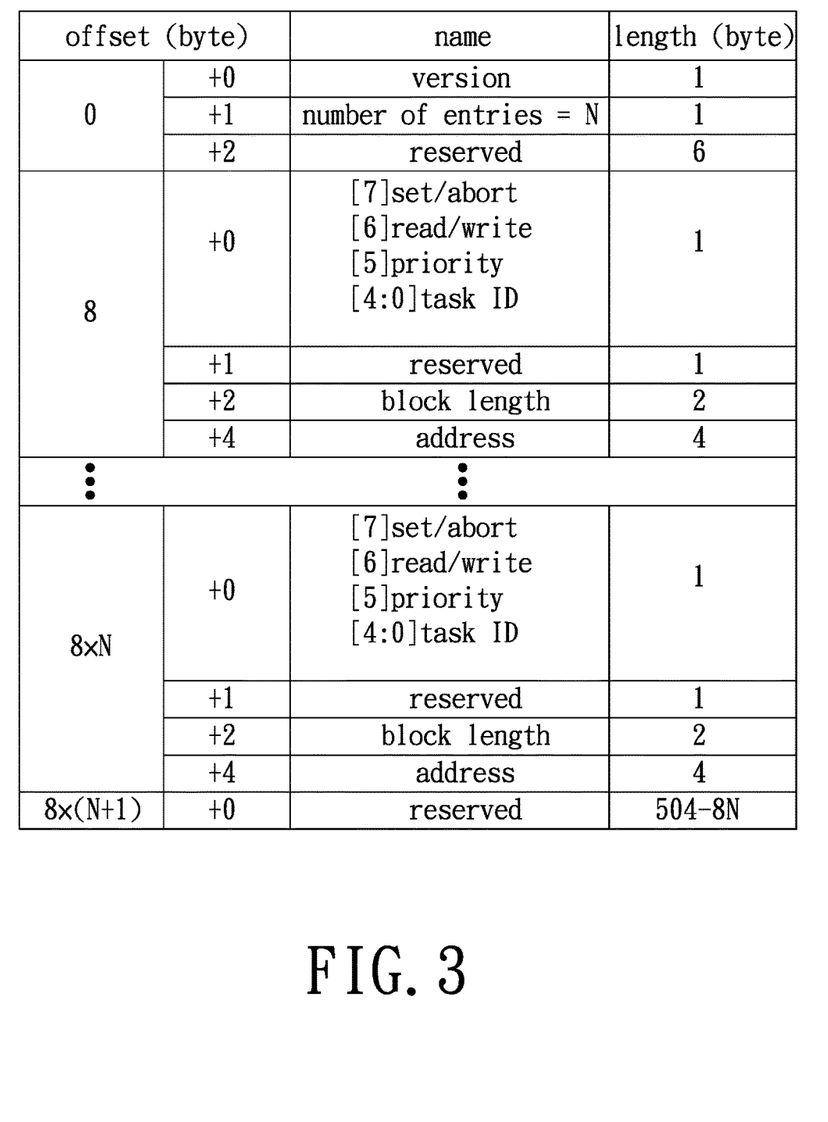
FIG. 3 is an exemplary definition of a task assignment packet in accordance with an embodiment of the present invention.

Referring to FIG. 3, which is an exemplary definition of a task assignment packet in accordance with an embodiment of the present invention. As shown in FIG. 3, the task assignment packet has 512 bytes, which contains N tasks. Each task has 8 bytes for storing related information, such as the setting about set task, abort task, read task, write task, priority, task ID, block length and address. In one embodiment, the task IDs of the N tasks from top to bottom are set from the first to the Nth in sequence; that is, the N tasks from top to bottom are set from are referred as the first task to the Nth task, respectively.

Figure 4:
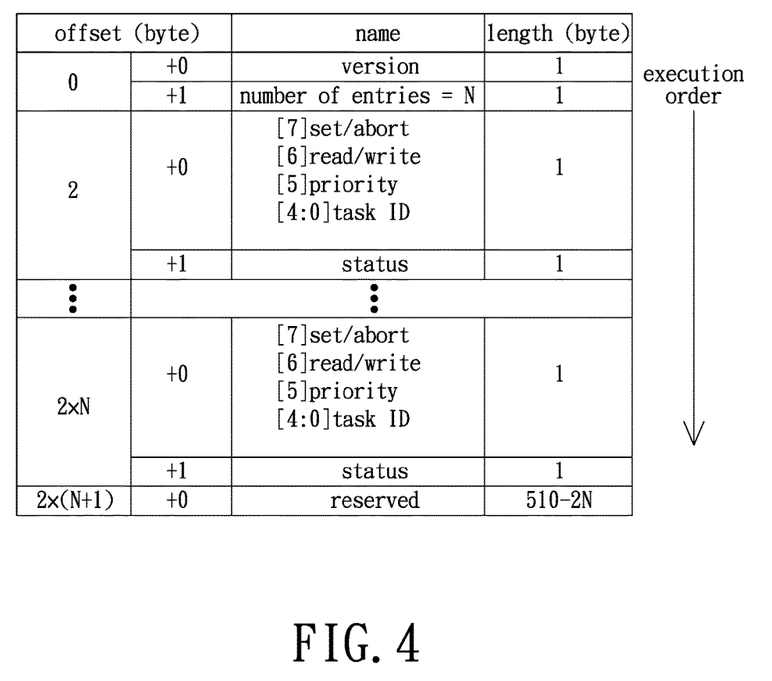
FIG. 4 is an exemplary definition of a task arrangement packet in accordance with an embodiment of the present invention.

Referring to FIG. 4, which is an exemplary definition of a task arrangement packet in accordance with an embodiment of the present invention. As shown in FIG. 4, the task arrangement packet also has 512 bytes, which contains N tasks. That is, the microprocessor 214 replies the task arrangement packet in response to each of the N tasks of the task assignment packet. Each task in the task arrangement packet has 2 bytes for storing related information, such as the setting about read task, write task, priority, task ID and status of task. In one embodiment, the execution order of the N tasks is from top to bottom. Further, the status of the aforementioned tasks may include good, write protection violation and out of range.

Figure 5:
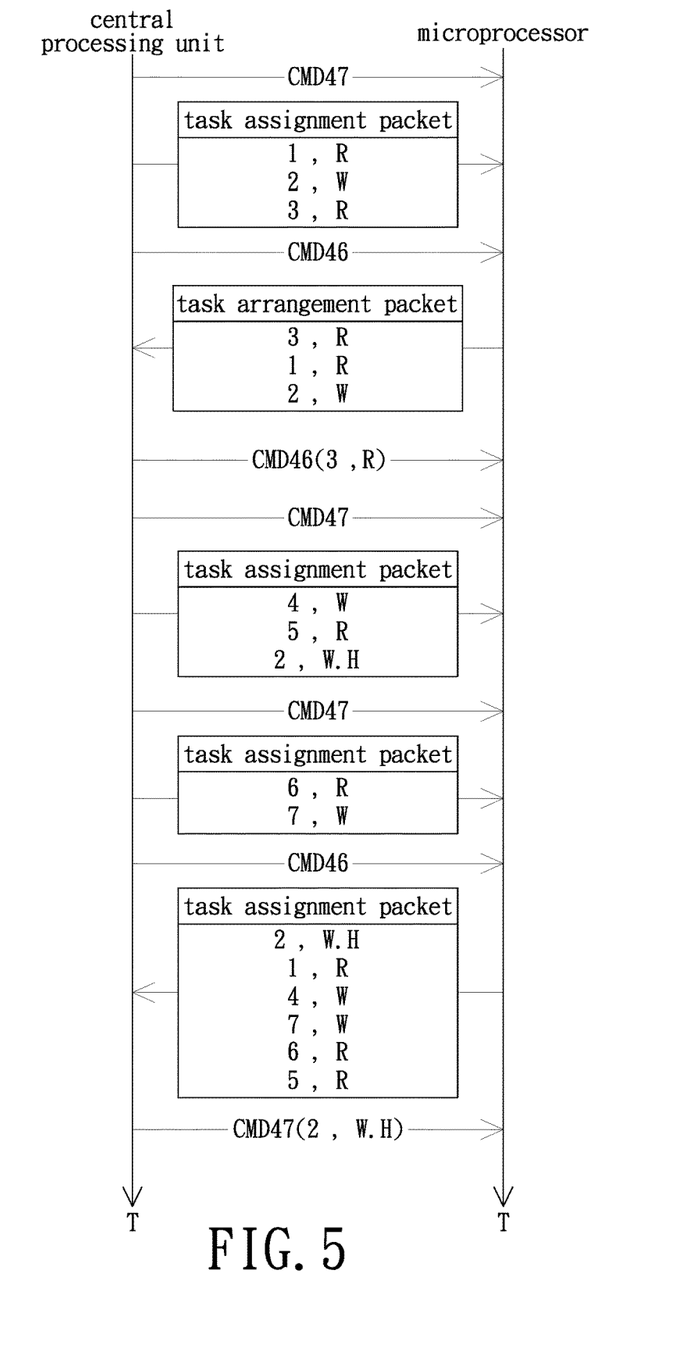
FIG. 5 illustrates an exemplary operation between a central processing unit and a microprocessor in accordance with an embodiment of the present invention.

Each of the aforementioned definitions is introduced. Please refer to FIG. 5 which illustrates an exemplary operation between the central processing unit 110 and the microprocessor 214 in accordance with an embodiment of the present invention. In FIG. 5, both of the two vertical axes represent time axes T.

When starting to assign tasks to the microprocessor 214, the central processing unit 110 first transmits a write command CMD47 to the microprocessor 214. The bit [31] in the write command CMD47 is set to 1 to inform the microprocessor 214 to get ready to receive a task assignment packet. Then, the central processing unit 110 transmits a task assignment packet to the microprocessor 214. In the exemplary embodiment, the task assignment packet contains three tasks, which are a first task (e.g., a read task and denoted by (1, R)), a second task (e.g., a write task and denoted by (2, W)) and a third task (e.g., a read task and denoted by (3, R)). Then, the microprocessor 214 generates the execution order of the currently-unprocessed tasks (that is, the first task (1, R), the second task (2, W) and the third task (3, R)) according to the resource allocation itself and the actual processing requirement of these tasks.

Next, the central processing unit 110 transmits a read command CMD46 to the microprocessor 214. The bit [31] in the read command CMD46 is set to 1 to inform the microprocessor 214 to start to transmit a task arrangement packet. Through the task arrangement packet from the microprocessor 214 in the exemplary embodiment, the central processing unit 110 is informed that the microprocessor 214 prefers or suggests to process the third task (3, R) first and then the first task (1, R) and the second task (2, W) in sequence. Accordingly, the central processing unit 110 can sequentially issues the commands to the microprocessor 214 to execute these three tasks according to the execution order in the aforementioned task arrangement packet. For example, the central processing unit 110 first transmits a read command CMD46 to the microprocessor 214, in which the bit [31] is set to 0 and the task ID is set to 3. Therefore, the microprocessor 214 is informed to execute the third task (3, R) having the highest priority of the execution order in the task arrangement packet.

If the central processing unit 110 plans to assign new tasks to the microprocessor 214 after the execution of the third task (3, R) but before the transmission of the read command CMD46 corresponding to the first task (1, R) to the microprocessor 214, the central processing unit 110 can transmit a write command CMD47 to the microprocessor 214. The bit [31] in the write command CMD47 is set to 1 to inform the microprocessor 214 to get ready to receive a task assignment packet. Then, the central processing unit 110 transmits a task assignment packet to the microprocessor 214. In the exemplary embodiment, the task assignment packet contains three tasks, which are a new fourth task (e.g., a write task and denoted by (4, W)), a new fifth task (e.g., a read task and denoted by (5, R)) and the original second task (assigned a priority and denoted by (2, W.H)). Then, the microprocessor 214 generates the execution order of the currently-unprocessed tasks (that is, the first task (1, R), the second task (2, W.H), the fourth task (4, W) and the fifth task (5, R)) according to the priorities of the currently-unprocessed tasks, the resource allocation itself and the actual processing requirement of the currently-unprocessed tasks.

If the central processing unit 110 further plans to assign new tasks to the microprocessor 214 now, the central processing unit 110 can transmit a write command CMD47 to the microprocessor 214. The bit [31] in the write command CMD47 is set to 1 to inform the microprocessor 214 to get ready to receive a task assignment packet. Then, the central processing unit 110 transmits a task assignment packet to the microprocessor 214. In the exemplary embodiment, the task assignment packet contains two tasks, which are a new sixth task (e.g., a read task and denoted by (6, R)) and a new seventh task (e.g., a write task and denoted by (7, W)). Then, the microprocessor 214 arranges the execution order of the currently-unprocessed tasks (that is, the first task (1, R), the second task (2, W.H), the fourth task (4, W), the fifth task (5, R), the sixth task (6, R) and the seventh task (7, W)) according to the priorities of the currently-unprocessed tasks, the resource allocation itself and the actual processing requirement of the currently-unprocessed tasks.

Next, the central processing unit 110 transmits a read command CMD46 to the microprocessor 214. The bit [31] in the read command CMD46 is set to 1 to inform the microprocessor 214 to start to transmit a task arrangement packet (that is, the latest task arrangement packet). Through the task arrangement packet from the microprocessor 214 in the exemplary embodiment, the central processing unit 110 is informed that the microprocessor 214 prefers or suggests to process the second task 2, W.H) set a priority first and then the first task (1, R), the fourth task (4, W), the seventh task (7, W), the sixth task (6, R) and the fifth task (5, R) in sequence. Accordingly, the central processing unit 110 sequentially issues the commands to the microprocessor 214 to execute the six tasks according to the execution order in the aforementioned task arrangement packet. For example, the central processing unit 110 first transmits a write command CMD47 to the microprocessor 214, in which the bit [31] is set to 0 and the task ID is set to 2. Therefore, the microprocessor 214 executes the second task (2, W.H) having the highest priority in the execution order in the task arrangement packet.

In the aforementioned embodiment, a flash memory is taken as an example for illustrating an operation of the data storage media 220; however, the present invention is not limited thereto. For the one in the art it is understood that the operation of the data storage media 220 may also apply to other types of data storage media.

Figure 6:
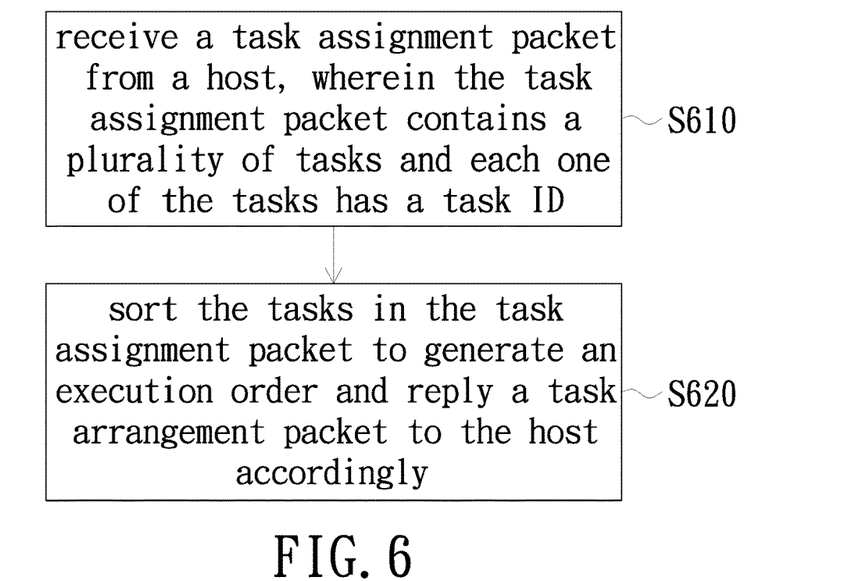
FIG. 6 is a flowchart of a task execution method of a storage device in accordance with an embodiment of the present invention.

FIG. 6 is a flowchart of a task execution method of a storage device in accordance with an embodiment of the present invention. As shown in FIG. 6, the task execution method of a storage device of the present embodiment includes steps of: receiving a task assignment packet from a host, wherein the task assignment packet contains a plurality of tasks and each one of the tasks has a task ID (step S610); and sorting the tasks of the task assignment packet to generate an execution order and accordingly replying a task arrangement packet to the host (step S620).

Figure 7:
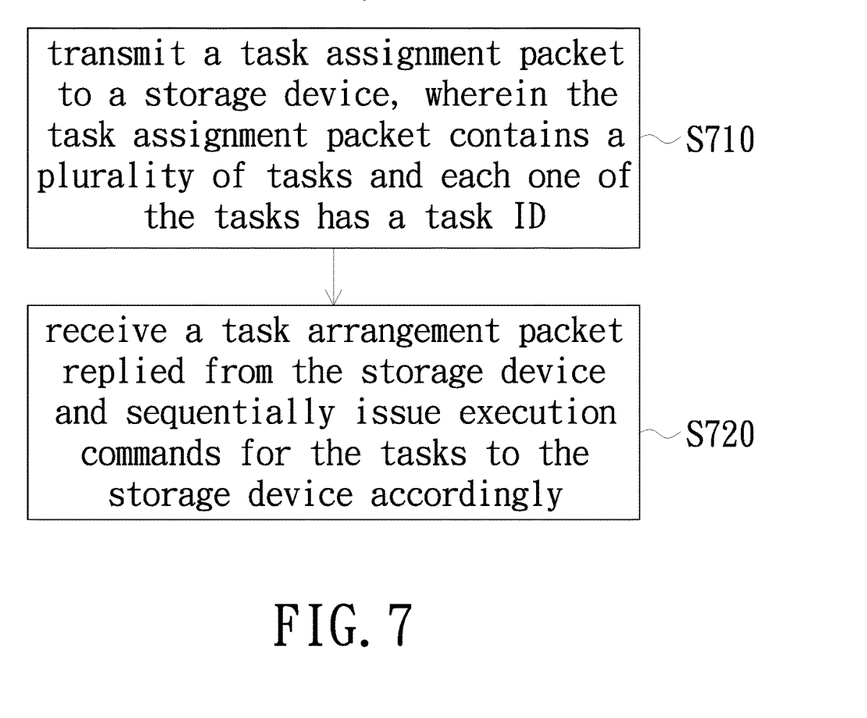
FIG. 7 is a flowchart of a task execution method of a host in accordance with an embodiment of the present invention.

FIG. 7 is a flowchart of a task execution method of a host in accordance with an embodiment of the present invention. As shown in FIG. 7, the task execution method of a host of the present embodiment includes steps of: transmitting a task assignment packet to a storage device, wherein the task assignment packet contains a plurality of tasks and each one of the tasks has a task ID (step S710); and receiving a task arrangement packet replied from the storage device and accordingly sequentially issuing commands to the storage device to execute the tasks (step S720).

In summary, a host of the present invention transmits a task assignment packet containing a plurality of tasks to a storage device of the present invention; the storage device of the present invention then sorts the tasks of the task assignment packet to generate an execution order and accordingly replies a task arrangement packet to the host; and the host of the present invention then sequentially issues commands to the storage device to execute of the tasks. Therefore, the storage device of the present invention has optimistic task execution efficiency.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A storage device, comprising:
a data storage media; and
a control unit, electrically coupled to the data storage media and configured for controlling an operation of the data storage media, wherein the control unit is further configured for receiving a task assignment packet from a host, the task assignment packet comprises a plurality of tasks and each of the tasks has a task identification (ID), wherein the control unit is further configured for sorting the tasks of the task assignment packet to generate an execution order for the tasks and reply the host with a task arrangement packet according to the execution order,
wherein the control unit is further configured for receiving at least one of the task IDs from the host and executing at least one of the tasks corresponding to the at least one of the task IDs, wherein the at least one of the task IDs corresponds to at least one of the tasks having a highest priority in the execution order,
wherein the task arrangement packet comprises the execution order for the tasks and the corresponding task IDs.

2. The storage device according to claim 1, wherein each of the tasks comprises a priority setting, wherein the control unit is further configured for sorting the tasks according to the priority settings to generate the execution order and reply the host with the task arrangement packet according to the execution order.

3. The storage device according to claim 1, wherein at least one of the tasks is a read task or a write task.

4. The storage device according to claim 1, wherein the control unit is further configured for receiving a write command from the host before receiving the task assignment packet.

5. The storage device according to claim 1, wherein the control unit is further configured for receiving a read command from the host before replying the host with the task arrangement packet.

6. The storage device according to claim 1, wherein the task arrangement packet further comprises a status of each of the tasks.

7. The storage device according to claim 1, wherein the data storage media is a non-volatile memory.

8. A host, comprising:
a connection interface, electrically coupled to a storage device; and
a central processing unit, configured for transmitting a task assignment packet to the storage device via the connection interface, wherein the task assignment packet comprises a plurality of tasks, each of the tasks has a task identification (ID), wherein the central processing unit is further configured for receiving a task arrangement packet replied from the storage device via the connection interface and sequentially issuing execution commands for the tasks according to the task arrangement packet to the storage device via the connection interface;
wherein each of the tasks comprises a priority setting; and
wherein the task arrangement packet comprises an execution order for the tasks of the task assignment packet stored by the storage device and the corresponding task IDs.

9. The host according to claim 8, wherein at least one of the tasks is a read task or a write task.

10. The host according to claim 8, wherein the central processing unit is further configured to transmit a write command to the storage device before transmitting the task assignment packet.

11. The host according to claim 8, wherein the central processing unit is further configured to transmit a read command to the storage device before receiving the task arrangement packet.

12. The host according to claim 8, wherein the task arrangement packet further comprises a status of each of the tasks.

13. A task execution method of a storage device, the task execution method comprising:
receiving a task assignment packet from a host, wherein the task assignment packet comprises a plurality of tasks and each of the tasks has a task identification (ID),
sorting the tasks in the task assignment packet to generate an execution order for the tasks and replying the host with a task arrangement packet according to the execution order;
receiving at least one of the task IDs from the host; and
executing at least one of the tasks corresponding to the at least one of the task IDs: wherein the at least one of the task IDs corresponds to at least one of the tasks having a highest priority in the execution order,
wherein the task arrangement packet comprises the execution order for the tasks and the corresponding task IDs.

14. The task execution method of a storage device according to claim 13, wherein each of the tasks comprises a priority setting, wherein the execution order for the tasks is sorted according to the priority settings of the tasks.

15. A task execution method of a host, the task execution method comprising:
transmitting a task assignment packet to a storage device, wherein the task assignment packet comprises a plurality of tasks and each of the tasks has a task identification (ID); and
receiving a task arrangement packet replied from the storage device and sequentially issuing execution commands for the tasks according to the task arrangement packet to the storage device;

wherein each of the tasks comprises a priority setting; and wherein the task arrangement packet comprises an execution order for the tasks of the task assignment racket stored by the storage device and the corresponding task IDs.

16. The task execution method of a host according to claim 15, further comprising:

transmitting a write command to the storage device before transmitting the task assignment packet.

17. The task execution method of a host according to claim 15, further comprising:

transmitting a read command to the storage device before receiving the task arrangement packet.

* * * * *